(12) United States Patent
Padovan et al.

(10) Patent No.: US 12,640,607 B2
(45) Date of Patent: May 26, 2026

(54) THREADED ROTOR PRESSURE PLATE

(71) Applicant: RIMAC AUTOMOBILI D.O.O., Sveta Nedjelja (HR)

(72) Inventors: Dominik Padovan, Nova Gorica (SI); Damir Vuljaj, Zagreb (HR); Hrvoje Crncic, Vrbovec (HR)

(73) Assignee: RIMAC AUTOMOBILI D.O.O., Sveta Nedjelja (HR)

( * ) Notice: Subject to any disclaimer, the term of this patent is extended or adjusted under 35 U.S.C. 154(b) by 179 days.

(21) Appl. No.: 18/438,654

(22) Filed: Feb. 12, 2024

(65) Prior Publication Data

US 2024/0186854 A1 Jun. 6, 2024

Related U.S. Application Data

(63) Continuation-in-part of application No. PCT/IB2021/058093, filed on Sep. 6, 2021.

(51) Int. Cl.
| | |
|---|---|
| *H02K 1/30* | (2006.01) |
| *H02K 7/04* | (2006.01) |
| *H02K 9/06* | (2006.01) |

(52) U.S. Cl.
CPC ................. *H02K 1/30* (2013.01); *H02K 7/04* (2013.01); *H02K 9/06* (2013.01)

(58) Field of Classification Search
CPC ........................................................ H02K 1/28
See application file for complete search history.

(56) References Cited

U.S. PATENT DOCUMENTS

| | | | | |
|---|---|---|---|---|
| 5,831,358 A | * | 11/1998 | Bobay ................... | H02K 29/10 |
| | | | | 310/58 |
| 2008/0174200 A1 | * | 7/2008 | Okamoto ............... | H02K 15/02 |
| | | | | 29/598 |
| 2017/0077772 A1 | * | 3/2017 | Izumi ...................... | H02K 7/04 |

FOREIGN PATENT DOCUMENTS

| | | | | |
|---|---|---|---|---|
| DE | 102018101303 A1 | * | 7/2018 | ............... H02K 1/28 |
| JP | 2018023186 A | * | 2/2018 | |

OTHER PUBLICATIONS

English Translation of DE102018101303A1 (Year: 2018).*
English Translation of JP2018023186A (Year: 2018).*

* cited by examiner

*Primary Examiner* — Terrance L Kenerly
*Assistant Examiner* — Theodore L Perkins
(74) *Attorney, Agent, or Firm* — Hodgson Russ LLP

(57) ABSTRACT

A pressure plate connectable to a rotor of an electric motor comprises an endbell portion set against a peripheral portion of the rotor and a connector linked to the endbell portion and adapted to be connected on the rotor; the connector comprising a single body protruding from the endbell portion towards the rotor in a fully assembled condition of the electric motor, the single body being adapted to be entirely and simultaneously connected to the rotor in the fully assembled condition of the rotor.

14 Claims, 2 Drawing Sheets

THREADED ROTOR PRESSURE PLATE

CROSS-REFERENCE TO RELATED APPLICATION

This application is a continuation-in-part of International Application No. PCT/IB2021/058093, filed Sep. 6, 2021, the entire disclosure of which is incorporated herein by reference.

FIELD

The present invention is related to structural components of/for electric motors, and more in detail it is related to the so-called "pressure plates" used in the moving or rotary parts of such electric motors.

BACKGROUND

It is known in the art that electric motors are usually built in two main sub-components, namely the stator (which is "fixed", e.g. with respect to an engine bay of a vehicle) and the rotor, which in turn rotates into the just cited stator: rotors usually bear a circumferential or coronal assembly of magnetically active elements, whose interaction with the dynamic magnetic fields generated in cooperation with the stator determine the erogation of torque (which is available at the central rotation shaft of the rotor itself).

For example, it is known from DE102018101303 an end plate secured to a rotor shaft by screwing while being restricted from rotating relative to the rotor shaft by a rotation restricting portion. The rotation restriction portion has recesses, grooves and an engaging portion. The depressions are provided on the outer circumference at equal angular intervals in the circumferential direction of the rotor shaft. The grooves are provided at equal angular intervals at positions different in number from that of the recesses to extend in the circumferential direction in a radially central portion of the end plate. At least one of the grooves faces radially one of the recesses. The engaging portion is disposed on a part of the end plate which is radially inward of the grooves. The engaging portion protrudes radially from a portion radially facing one of the recesses and engages the recess to restrict the end plate from moving relative thereto.

It is also known from EP1947758 a method of manufacturing a rotor of an electric motor, the rotor including a laminated core of multilayer structure formed from electromagnetic thin plates laminated in an axial direction of a rotational shaft, and a pair of end plates disposed on opposite sides in the axial direction of the laminated core. The rotor is also rotatably disposed in an inside of a stator, and the method includes the steps of: fitting the rotational shaft into an insertion hole formed in a center region of the end plates having elasticity in a direction of plate thickness; positioning the end plates at specified position on the rotational shaft; and abutting either one of the end plates in elastically deformed state to at least one end of the laminated core.

The assembly—or otherwise defined "pack"—of magnetically active elements in the rotor is held in position by appropriate pressure plates, which are placed at respectfully opposite longitudinal ends of the rotor shaft and which keep in positions the magnetically active elements themselves: usually, known-type pressure plates are mounted on the rotor shaft or core through a plurality of bolts or similar fastening devices, so as to exert a suitable axial pressure on the magnetically active elements.

These known-type pressure plates have some substantial drawbacks, which are mainly related to high assembly times and to the necessity of providing a very accurate and repeatable tightening torque for all the bolt-type interconnections; beside this, pressure plates known in the art may have, owing to their complex geometry (which must be designed and machined in order to provide multiple slots for the insertions of the bolts), non-negligible problems in terms of non-even mass distribution, and thereby causing strong vibration and/or inertial unwanted effects during the operating phase of the engine.

SUMMARY

Having stated the prior art drawbacks, it's an object of the present invention to provide a pressure plate, and therefore, an electric motor whose rotor is enhanced by such pressure plate (or plates) which can overcome the aforementioned drawbacks, and more in particular it's an object of the present invention to provide a pressure plate which allows for significantly reduced assembly times, offers a superior quality and spatial uniformity of the mechanical containment action exerted on the pack of magnetically active elements in/of the rotor and which can be significantly improved also in terms of mass static and dynamic balancing.

It is also an object of the present invention to provide for a pressure plate enhanceable with additional functions such as the chance to be dynamically balanced through fast and easy operations, along with the capability of inducing a cooling flow within the engine.

BRIEF DESCRIPTION OF THE DRAWINGS

These aims, along with other technical advantages, will be illustrated and achieved by an electric motor rotor pressure plate according to the present invention as described and claimed hereinafter, and represented in an exemplificative yet not limiting embodiment in the annexed figures, wherein:

DETAILED DESCRIPTION

Figure 2:
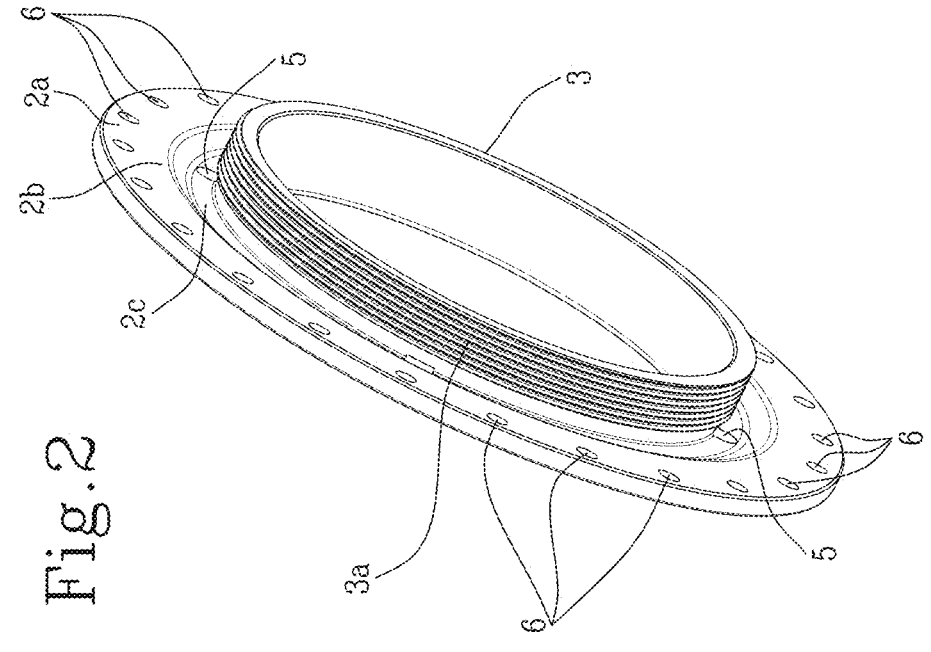
FIG. 2 is a perspective view of a first embodiment of a pressure plate according to the invention.

In the annexed figures, the pressure plate according to the invention as a whole has been numbered with "1" and substantially comprises an endbell portion 2, adapted to be set against peripheral portion of an electric engine rotor, and suitable connector linked to the endbell portion 2: such a connector is therefore adapted to be connected on said rotor, and advantageously they comprise a single body 3 protruding from said endbell portion 2 towards said rotor in a fully assembled condition of said electric motor.

From the functional standpoint, and in accordance with the hereby described and claimed inventive concept, the just cited single body 3 is adapted to be entirely and simultaneously connected to the rotor, so as to determine a fully assembled condition of the rotor itself: this fully assembled condition is achieved through a single and very fast (yet accurate in terms of screwing-in, and therefore, in terms of even mechanical pressure exerted by the plate 1 against the other rotor components and/or parts) assembly operation.

In fact, delving deeper into details and looking at the annexed figures, the single body 3 comprises an attachment mechanism adapted to determine a uniform mechanical binding force throughout an area of connection mutually defined by said single body 3 and the rotor (and/or, otherwise stated, a uniform mechanical pressure throughout an area of adjacency mutually defined by the endbell 2 and the rotor): even more advantageously, the single body 3 may comprise a reversible or releasable connector so as to allow dismantling of the rotor (e.g. in case of replacement of the magnetically active elements or for whatever any other technical reason which may arise).

In the annexed figures, the reversible or releasable connector comprises a threaded portion 3a circumferentially extending on said single body 3 and adapted to mesh with a counter-shaped threaded portion 3b located on said rotor.

Turning back to the endbell portion 2, it can be seen that it comprises an outer portion 2a, having a substantially planar development onto a first ideal geometric plane perpendicular to an axis of rotation of said rotor: such an outer portion 2a may conveniently be ring-shaped and/or coronal-shaped.

The endbell portion 2 also may comprise an intermediate portion 2b connected to the outer portion 2a: this intermediate portion 2b presents a tapered and/or a frustoconical development along the axis of rotation of the rotor and it functionally can encompass and/or comprise a preloading mechanism (e.g.: exerting an elastic reaction force which is proportional to their geometry and to their state of deformation induced by the mounting of the pressure plate 1 to the rotor shaft) adapted to impart and/or enhance a mechanical pressure exertable by the outer portion 2a on the rotor itself.

Beside this, the endbell portion 2 may also comprise an inner portion 2c, which is connected to the intermediate portion 2c and which has a substantially planar development onto a second ideal geometric plane perpendicular to an axis of rotation of said rotor (said second ideal geometric plane is axially displaced, along the rotation axis of the rotor, with respect to said first ideal geometric plane): such an inner portion 2c is therefore connected to said single body 3.

Figure 4:
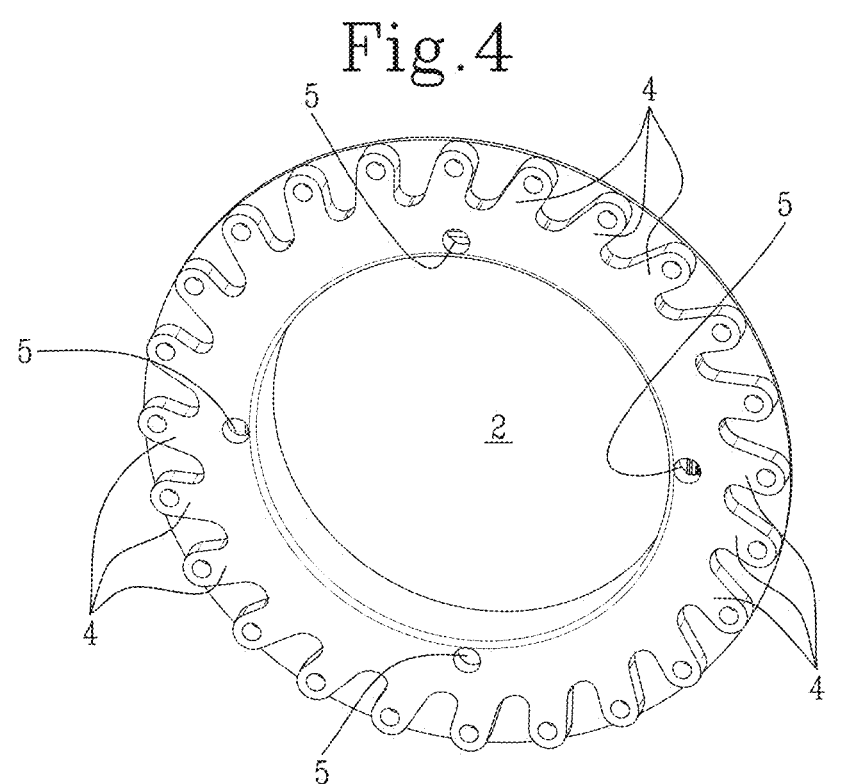
FIG. 4 is a perspective view of a second embodiment of a pressure plate according to the invention.

According to the invention, the pressure plate 1 may also comprise ventilation-inducing elements 4 located on the endbell 2 (and/or, if required, in the single body 3): such ventilation-inducing elements are adapted to generate a flow and/or a circulation of a cooling fluid within and/or around and/or in proximity of the rotor in said fully assembled condition of said rotor, and according the exemplifying FIG. 4, they can be shaped as suitable vanes having wave-like contours which cooperatively act as a centrifugal or centripetal impeller moving air and/or cooling medium around them.

The pressure plate 1 may also include engagement elements 5 located in the outer portion 2a and/or in the intermediate portion 2b and/or in the inner portion 2c and adapted to receive a tool for engaging or disengaging the pressure plate 1 itself onto or from the engine rotor: it is to be noted that the tool engageable with the pressure plate according to the invention can be a single tool and can be used to perform a single operation instead of multiple tools and/or multiple operating steps required for the known-type pressure plates.

According to a further optional technicality of the invention, the pressure plate 1 may also comprise one or more ballast location housings 6 radially located in the outer portion 2a and/or in the intermediate portion 2b and/or in the inner portion 2c: these housings 6 are adapted to receive one or more balancing ballasts, which in turn may be useful for the determination of the overall balancing of the entire rotor after one or more pressure plates (usually, two) are mounted onto the rotor shaft.

Turning back to the hereabove cited ventilation-inducing elements 4 and looking in deeper detail at FIG. 4, it can be seen that a plurality of channeling blades and/or vanes and/or plates and/or profiled bodies can be implemented in the present invention: such blades and/or vanes and/or plates and/or profiled bodies extend from the outer portion 2a (and/or from the intermediate portion 2b and/or from the inner portion 2c) and are adapted to generate a centrifugal or centripetal flow of a suitable cooling fluid/medium with respect to the rotation axis of the rotor.

It is an object of the present invention also a fully assembled rotor, numbered as "10" in the annexed figured and conveniently placeable in/for an electric motor, such rotor 10 comprising essentially a rotor shaft 7 adapted to rotate around a rotation axis and a magnetically-active group 8 (or "pack") circumferentially connected to the rotor shaft 7: advantageously, such rotor further comprises at least one, and preferably two pressure plates 1 connected to the rotor shaft 7 and adapted to locate and/or stack and/or pack the just cited magnetically-active group 8 with respect to the rotor shaft 7 itself (of course, such pressure plate or plates 1 are according to what hereabove described and/or to what herebelow claimed).

More in detail, the rotor shaft 7 comprises a central core 8a e.g., having cylindrical shape and lying along the axis of rotation of the rotor, a connection flange 8b radially extending from the central core 8a (e.g., radially extending from a middle portion of the central core 8a) and a bearing crown 8c circumferentially supported by the connection flange 8b and supporting one or more magnetically active bodies 9: conveniently, the bearing crown 8c being adapted to respectively receive in engagement at least a pressure plate 1.

Figure 1:
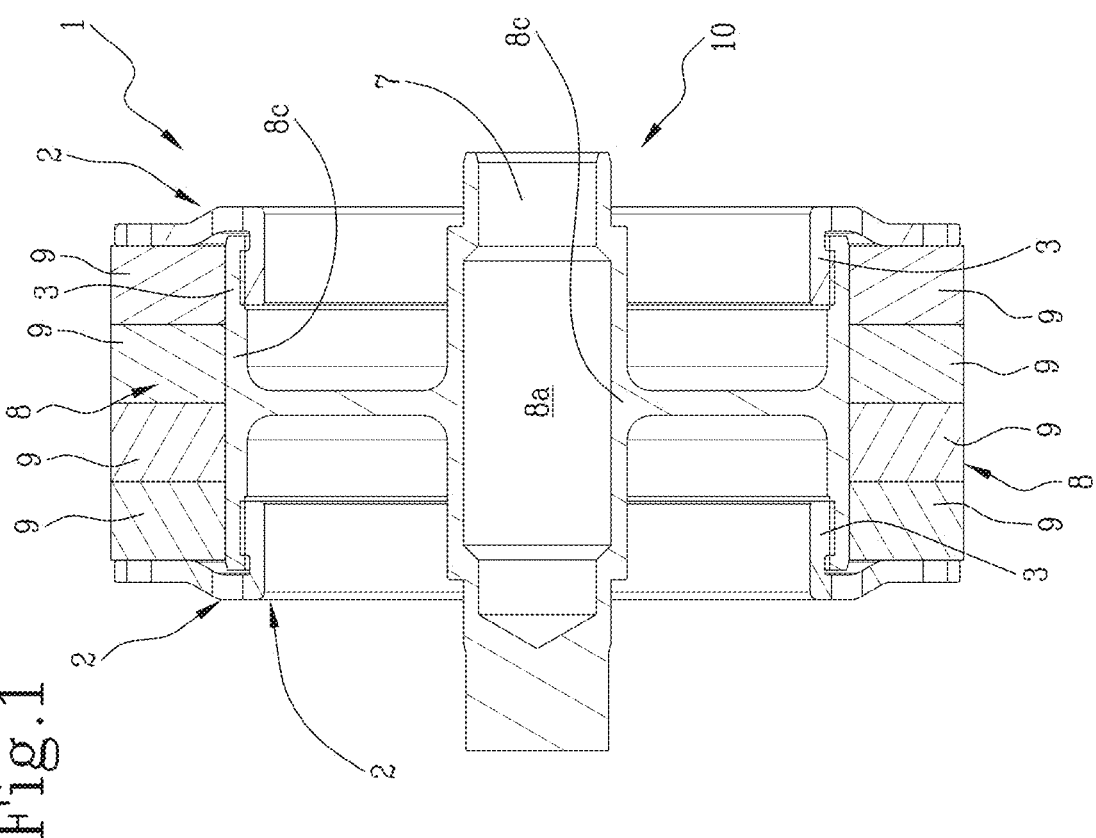
FIG. 1 is a view, in longitudinal section along a rotor rotation axis, of an electric engine rotor encompassing two pressure plates according to the invention.
Figure 3:
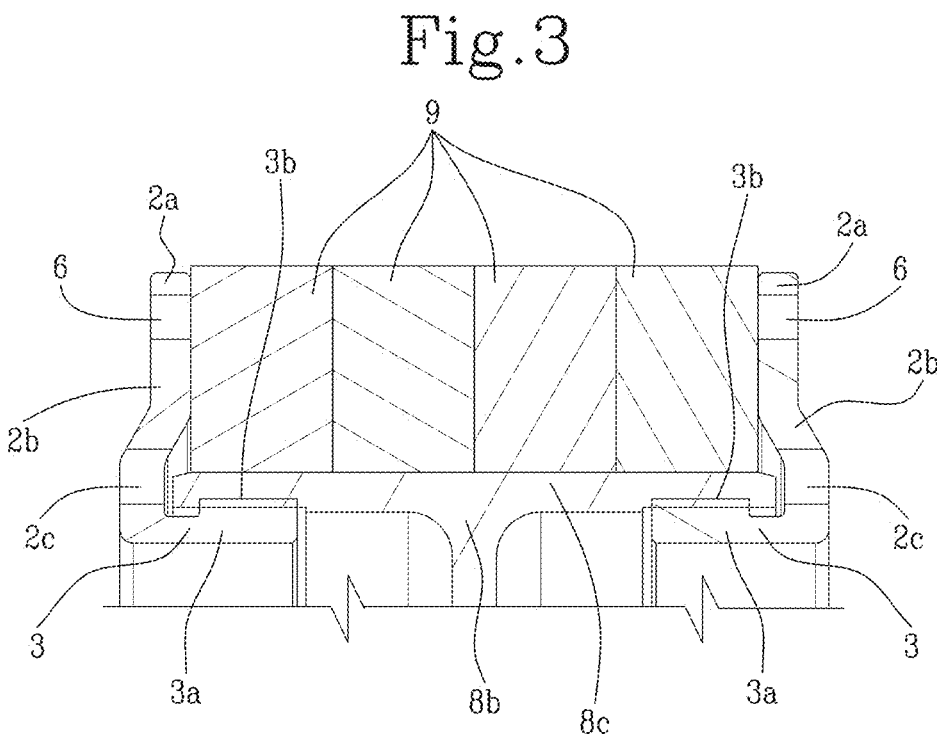
FIG. 3 is a zoom-in of FIG. 1 showing a portion of the rotor in which the pressure plates according to the invention interact with the magnetically active elements (of the rotor itself)

In order to gain intermeshing capability with the pressure plate 1, the bearing crown 8c comprises a threaded portion (and typically two threaded portions located at mutually opposite extremities of the bearing crown 8c itself) along the axis of rotation of the rotor 10: such threaded portion or portions are adapted to engage with respective threaded portion (or portions) 3a circumferentially extending on the single body 3 of the pressure plate (or plates) 1 in a fully assembled condition of the rotor 10 (as for example depicted in FIGS. 1 and 3).

The described, illustrated and claimed invention achieves the technical aims and surpasses the shortcomings of the prior art hereabove mentioned.

As a matter of fact, the overall structural architecture of the pressure plate allows for a very fast and accurate mounting onto the rotor shaft, avoiding multiple intervention on too many bolting/connection elements and relying on an "attachment protrusion" whose geometry and coherence can be determined with higher precision: this in turn enhances reliability of the pressure plate and of the assembled rotor, along with an accurate determination of the mechanical pressure on the magnetically active elements of the rotor itself.

Furthermore, the pressure plate according to the invention can be crafted with highly homogeneous mass distribution and can also be provided with extra functionalities (motor cooling capabilities and/or fine tuning of the mass distribution if required) with very simple and effective technical options.

Generally speaking, the pressure plate according to the present invention can also be implemented in any other embodiment enclosed in its inventive concept as claimed, also by way of collateral modifications available to a skilled technician in the technical sector of pertinence of the invention itself, and thus maintaining the functional achievements of the invention along with practicality of production, usage, assembly and maintenance.

The invention claimed is:

1. A pressure plate connectable to a rotor of an electric motor, comprising:

an endbell portion adapted to be set against a peripheral portion of the rotor; and a connector linked to the endbell portion and adapted to be connected on the rotor, the connector comprising a single body protruding from the endbell portion towards the rotor in a fully assembled condition of the electric motor, the single body being adapted to be entirely and simultaneously connected to the rotor in the fully assembled condition of the rotor, wherein the connector comprises a threaded portion circumferentially extending on the single body;

wherein the threaded portion circumferentially extending on the single body is adapted to engage with a bearing crown of the rotor, the bearing crown comprises two threaded portions located at mutually opposite extremities of the bearing crown along an axis of rotation of the rotor, the bearing crown is circumferentially supported by a connection flange of the rotor and supports one or more magnetically active bodies, the connection flange radially extends from a middle portion of a central core of the rotor, and the central core has cylindrical shape and lies along the axis of rotation of the rotor;

wherein the endbell portion comprises:

an outer portion having a substantially planar development onto a first ideal geometric plane perpendicular to the axis of rotation of the rotor;

an intermediate portion connected to the outer portion and presenting a tapered and/or a frustoconical development along the axis of rotation of the rotor; and an inner portion connected to the intermediate portion and having a substantially planar development onto a second ideal geometric plane perpendicular to the axis of rotation of the rotor and axially displaced, along the axis of rotation, with respect to the first ideal geometric plane, the inner portion being connected to the single body.

2. The pressure plate of claim 1, wherein the single body comprises an attachment mechanism adapted to determine:

a uniform mechanical binding force throughout an area of connection mutually defined by the single body and the rotor; and/or a uniform mechanical pressure throughout an area of adjacency mutually defined by the endbell and the rotor.

3. The pressure plate of claim 1, wherein the single body comprises a reversible or releasable connector.

4. The pressure plate of claim 1, wherein the outer portion of the endbell portion is ring-shaped and/or coronal-shaped.

5. The pressure plate of claim 1, wherein the intermediate portion of the endbell portion comprises preloading mechanism adapted to impart and/or enhance a mechanical pressure exerted by the outer portion on the rotor.

6. The pressure plate of claim 1, further comprising one or more of the following:

ventilation-inducing elements located on the endbell and/or in the single body and adapted to generate a flow and/or a circulation of a cooling fluid within and/or around and/or in proximity of the rotor in the fully assembled condition of the rotor;

engagement elements located in the outer portion and/or in the intermediate portion and/or in the inner portion and adapted to receive a tool for engaging or disengaging the pressure plate onto or from the rotor; and one or more ballast location housings radially located in the outer portion and/or in the intermediate portion and/or in the inner portion and adapted to receive one or more balancing ballasts.

7. The pressure plate of claim 6, wherein the ventilation-inducing elements comprise a plurality of channeling blades and/or vanes and/or plates and/or profiled bodies extending from the outer portion and/or from the intermediate portion and/or from the inner portion and adapted to generate a centrifugal or centripetal flow of the cooling fluid with respect to the axis of rotation of the rotor.

8. A rotor for an electric motor, comprising:

a rotor shaft adapted to rotate around an axis of rotation;

a magnetically active group circumferentially connected to the rotor shaft; and at least one pressure plate connected to the rotor shaft and adapted to locate and/or stack and/or pack the magnetically active group with respect to at least the rotor shaft;

wherein the at least one pressure plate comprises:

an endbell portion adapted to be set against a peripheral portion of the rotor; and a connector linked to the endbell portion and adapted to be connected on the rotor, the connector comprising a single body protruding from the endbell portion towards the rotor in a fully assembled condition of the electric motor, the single body being adapted to be entirely and simultaneously connected to the rotor in the fully assembled condition of the rotor, wherein the connector comprises a threaded portion circumferentially extending on the single body of the pressure plate;

wherein the rotor shaft comprises:

a central core having cylindrical shape and lying along the axis of rotation of the rotor;

a connection flange radially extending from a middle portion of the central core; and a bearing crown circumferentially supported by the connection flange and supporting one or more magnetically active bodies, the bearing crown being adapted to respectively receive in engagement the at least one pressure plate, wherein the bearing crown comprises two threaded portions located at mutually opposite extremities of the bearing crown along the axis of rotation of the rotor, the threaded portions being adapted to engage with the threaded portion circumferentially extending on the single body of the pressure plate;

wherein the endbell portion comprises:

an outer portion having a substantially planar development onto a first ideal geometric plane perpendicular to the axis of rotation of the rotor;

an intermediate portion connected to the outer portion and presenting a tapered and/or a frustoconical development along the axis of rotation of the rotor; and an inner portion connected to the intermediate portion and having a substantially planar development onto a second ideal geometric plane perpendicular to the axis of rotation of the rotor and axially displaced, along the axis of rotation, with respect to the first ideal geometric plane, the inner portion being connected to the single body.

9. The rotor of claim 8, wherein the single body comprises an attachment mechanism adapted to determine:

a uniform mechanical binding force throughout an area of connection mutually defined by the single body and the rotor; and/or a uniform mechanical pressure throughout an area of adjacency mutually defined by the endbell and the rotor.

10. The rotor of claim 8, wherein the single body comprises a reversible or releasable connector.

11. The rotor of claim 8, wherein the outer portion of the endbell portion is ring-shaped and/or coronal-shaped.

12. The rotor of claim 8, wherein the intermediate portion of the endbell portion comprises preloading mechanism adapted to impart and/or enhance a mechanical pressure exerted by the outer portion on the rotor.

13. The rotor of claim 8, further comprising one or more of the following:

ventilation-inducing elements located on the endbell and/or in the single body and adapted to generate a flow and/or a circulation of a cooling fluid within and/or around and/or in proximity of the rotor in the fully assembled condition of the rotor;

engagement elements located in the outer portion and/or in the intermediate portion and/or in the inner portion and adapted to receive a tool for engaging or disengaging the pressure plate onto or from the rotor; and one or more ballast location housings radially located in the outer portion and/or in the intermediate portion and/or in the inner portion and adapted to receive one or more balancing ballasts.

14. The rotor of claim 13, wherein the ventilation-inducing elements comprise a plurality of channeling blades and/or vanes and/or plates and/or profiled bodies extending from the outer portion and/or from the intermediate portion and/or from the inner portion and adapted to generate a centrifugal or centripetal flow of the cooling fluid with respect to the axis of rotation of the rotor.

\* \* \* \* \*